United States Patent [19]

Burkman, Sr. et al.

[11] 4,347,499

[45] Aug. 31, 1982

[54] EMERGENCY GUIDANCE SYSTEM

[75] Inventors: Thomas F. Burkman, Sr., 7525 Monroe, Niles, Ill. 60648; Gary Cummings, Torrance, Calif.

[73] Assignee: Thomas F. Burkman, Sr., Niles, Ill.

[21] Appl. No.: 222,002

[22] Filed: Jan. 2, 1981

[51] Int. Cl.³ .............................................. G08B 7/00
[52] U.S. Cl. ................................ 340/371; 340/286 R; 340/332; 362/153
[58] Field of Search .............. 340/286 R, 309.4, 326, 340/332, 371; 362/153

[56] References Cited

U.S. PATENT DOCUMENTS 3,916,404 10/1975 Gouge ................................ 340/371

Primary Examiner—Harold I. Pitts
Attorney, Agent, or Firm—J. R. Halvorsen

[57] ABSTRACT

This invention relates to an emergency guidance system which provides a plurality of discernable means which are electronically interconnected to provide a sequentially pulsed system that is responsive to sensing means that determine the availability of an exit for use in the event of a catastrophe. Control means are provided that evaluate the input from the sensing means and dependent upon availability of exits cause the discernible means to cycle sequentially through predetermined patterns dictated by the available exits. The discernible means can be visual, audible, or tactile.

33 Claims, 13 Drawing Figures

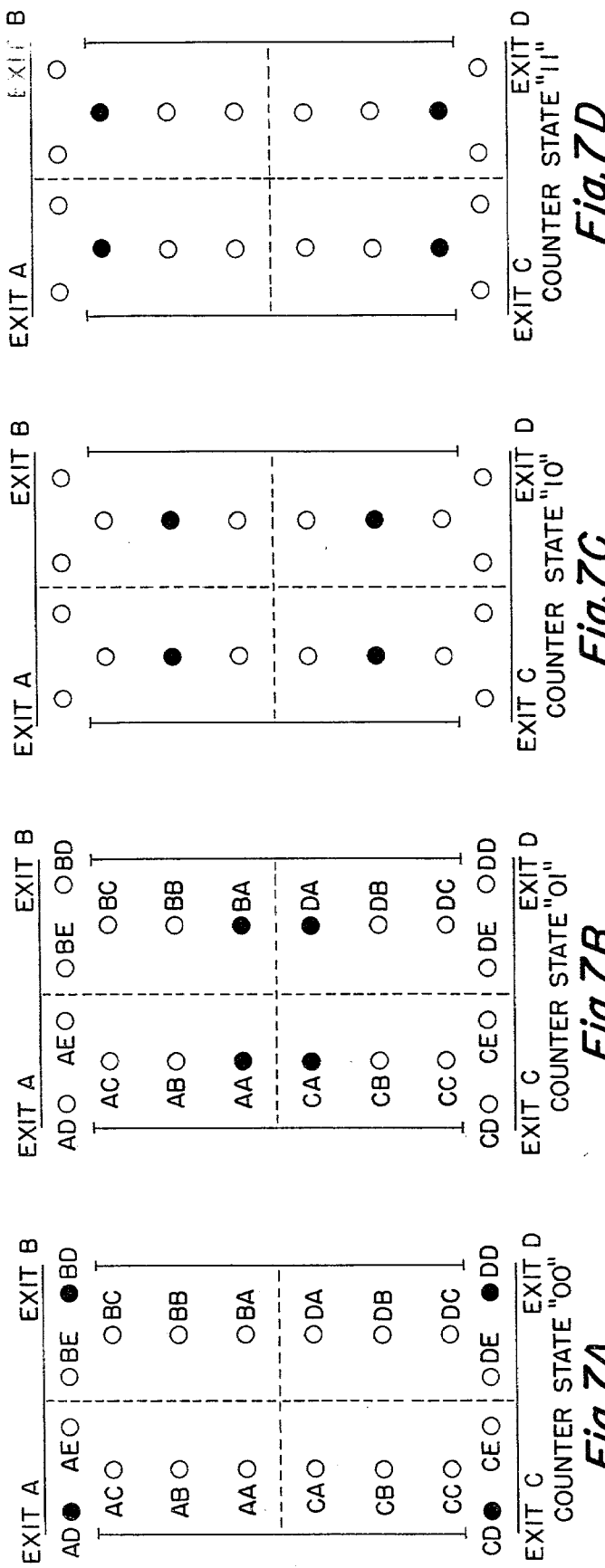

EMERGENCY GUIDANCE SYSTEM

BACKGROUND OF THE INVENTION

This invention relates generally to emergency illuminating devices intended for use mainly in aircraft and adapted to operate under serious impact or distress conditions resulting from crashing of the aircraft or in the case of fire or explosions. It should be understood, however, that the principles of the invention can be applied to other structures such as hotels or public buildings, as well as including audible or tactile discernible means, in time of emergency such as fires or explosions.

In most aircraft, or other public structures, the means for illumination is generally located overhead, as are the emergency exit signs. It has been noted that in most crashes or fires large amounts of smoke or other small particulate matter is suspended in the air which makes the illumination and exit signs virtually ineffective. Additionally, confusion and panic tend to reign supreme and instructions given by the flight crew relative to location of emergency exits is forgotten or misinterpreted.

It is paramount that an illuminating device that locates the emergency exits of aircraft be designed to operate instantly in response to impact, temperature elevations, and/or smoke. Every second that can be saved in removing the occupants from the environment is important since delays can result in serious injury, a matter of life or death.

In the past, most attempts have been to provide high intensity lights, adjacent exits, that are activated either upon impact or upon an excessive deceleration of the aircraft. These devices do not provide specific guidance to the passengers other than to merely locate a particular exit and, again, because of their nature, are generally located at an elevated position subject to camouflage by smoke or other particulate matter. Such devices can be found in U.S. Pat. No. 3,411,131 issued Nov. 12, 1968 and No. 3,428,941 issued Feb. 18, 1969 both being in the name of B. V. Hewes.

The transmission of light by edge lighted plastic materials has been utilized in environments other than those contemplated by the present invention, for example see U.S. Pat. No. 2,672.551 issued Mar. 16, 1954 in the name of D. H. Hale et al; No. 2,699,141 issued Jan. 11, 1955 in the name of E. O. Gaguski; No. 3,144,643 issued Aug. 11, 1964 in the name of P. H. A. Andersson; and No. 3,169,506 issued Feb. 16, 1965 in the name of W. J. Morris. None of these devices teach or suggest their use with sequentially pulsed light sources for emergency guidance systems.

SUMMARY OF INVENTION

The present invention contemplates the use of a plurality of spaced light sources positioned in the floor of a passenger compartment aisle in an aircraft or along the wall of a public building, such as a hotel. An elongated strip of light transmitting material extends outwardly from each light source in a predetermined pattern, generally axially along the passageway or aisle in question. Sensing means are provided at each emergency exit, either automatic or manual override in nature, to signal the availability of that particular exit following the emergency activation of the system. The sensing means may, for example, feed an input into a programmed Integrated Circuit of the Read-Only Memories (ROM) variety which in turn provides data for a programmed cycling of the light sources in a timed relation to provide a moving light pattern to direct the occupants to an available safe exit as determined by the sensing mechanisms. In this example, the Read-Only Memories contain lamp pattern data which is output and displayed one state of condition at a time. At any moment, the displayed state is a function of the available exits and the current state of the lamp sequence counter.

An alternative approach, utilizing more recent technology, would be a microprocessor based design incorporating a single chip microprocessor having program and lamp pattern look up tables in ROM, as well as Random Access Memory (RAM, or Read-Write Memory) for temporary storage, and an arithmetic logic unit (ALU) which performs the data manipulation as defined by the program stored in thr program storage ROM.

Some of the more important objects of the present invention are the following:

- to provide a device of the character stated which will carry out the sequential signalling function noted above while still exhibiting the characteristic of being easily installed in compact form in either existing aircraft, hotels, etc., or installed as original equipment during the assembly of new aircraft and/or new buildings;
- to provide a device which is inconspicuous to the casual observer and at the same time capable of providing a controllable source of constant illumination located at a low elevation with said passenger compartment or hallway;
- to provide a solid state electronic control system capable of operating after subjecting it to severe shock conditions, be they from impact or from elevated temperatures or smoke;
- to provide instant manual override capabilities to said control system for those instances when the catastrophe sensing means are rendered inoperative;
- to provide a combined system which can be demonstrated by manual controls without disturbing the automatic features of the system and which upon catastrophic activation brings the system to its highest level of intensity;
- to provide an audio circuit for pre-recorded audible instruction to the occupants and passengers immediately upon activation;
- to provide a programmed system that eliminates the necessity of thought process on the part of the flight crew in time of emergency. A pattern of cycled light sources or other pulsed discernible means is automatically provided in response to sensing means at each of the available exits, dependent upon their condition after the catastrophe, to lead the passengers or occupants along a pre-programmed path to a safe available exit.

Other objects will be apparent to those skilled in the art. The structure and circuitry contained herein are exemplary embodiment capable of carrying out this invention. Other structures and circuitry will be apparent to those skilled in the art and may be contemplated as equivalents to those discussed herein, and will become apparent from the following description and drawings annexed hereto, wherein similar parts are identified by similar numerals throughout the several views.

BRIEF DESCRIPTION OF THE DRAWINGS

FIGS. 7A through D are a schematic showing the lamp sequence (as black circles) when none of the exits are blocked;

FIG. 7F is a block diagram of three ROMs showing the sequence of lamp illumination at particular counter states.

DETAILED DESCRIPTION

A system of the type contemplated by the present invention includes an electro-mechanical-optical portion and a control portion actively interconnected for optimum operation. While particular sensing means are utilized at each of the exits to indicate the availability of a particular exit, it should be understood that the broad term "sensing means" is meant to encompass a broad variety of means such as impact switches, temperature sensing means, smoke or particulate suspension sensing means, as well as simple switch means which indicate an inability to operate a given hatch or exit door. Other forms of sensors are contemplated as being included since their input is all that is required for operation of this system.

Figure 1:
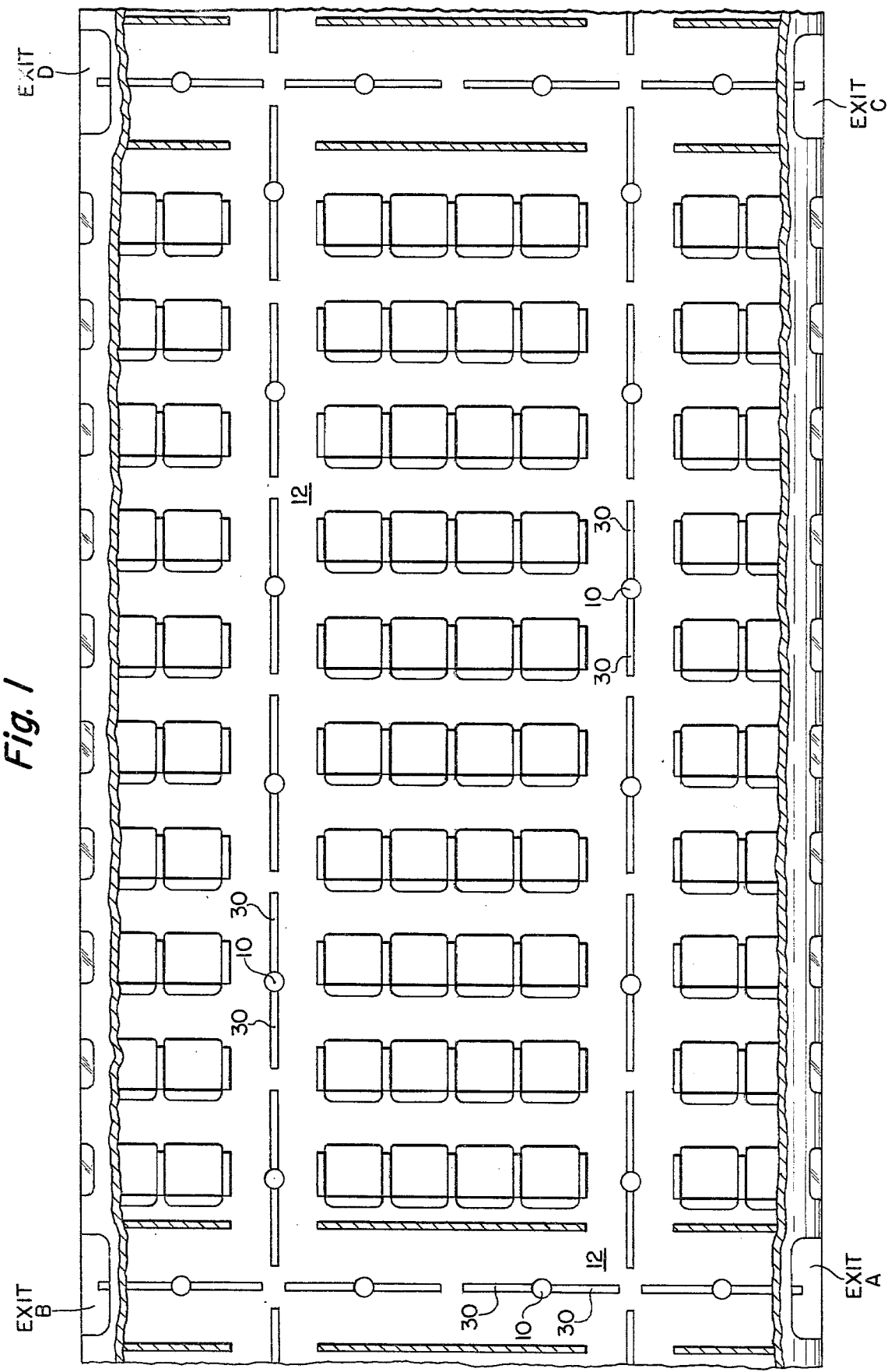
FIG. 1 is a plan view in partial section of one section of an aircraft fuselage showing a portion of a passenger compartment wherein an embodiment of the present invention is utilized.
Figure 2:
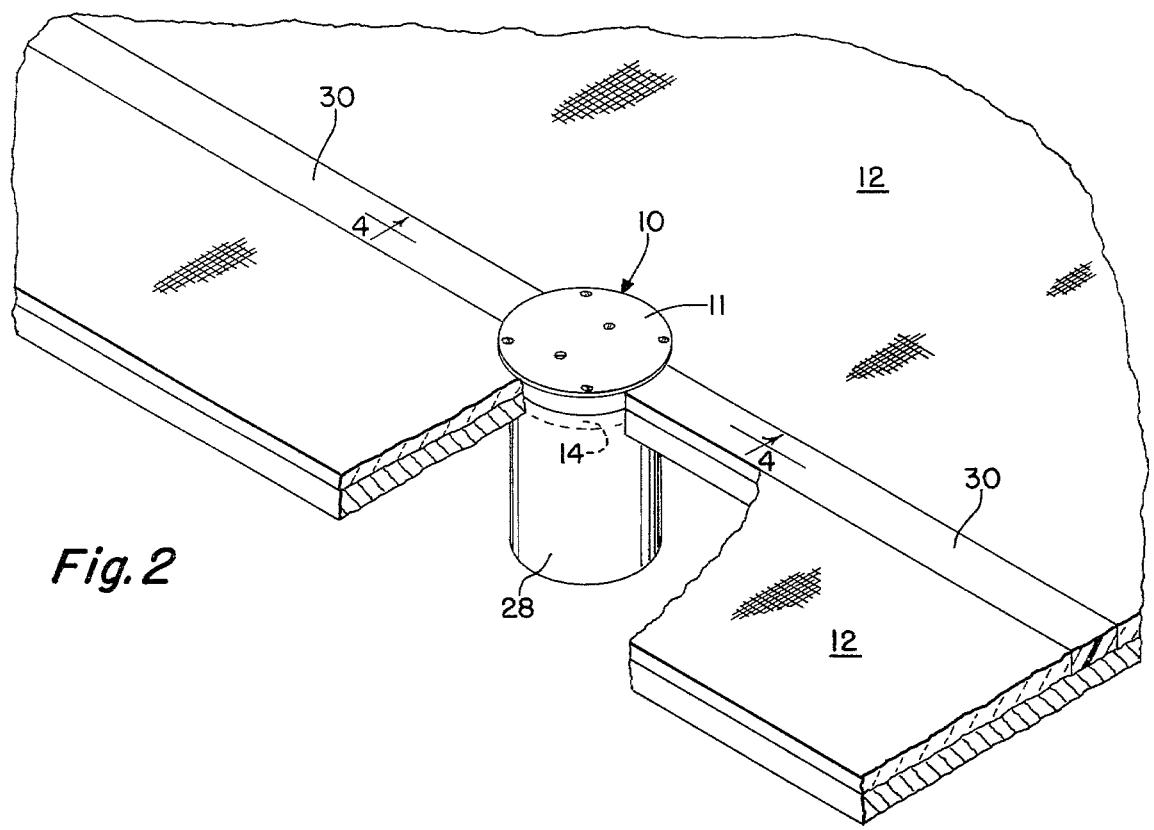
FIG. 2 is a perspective view, in partial section, of a typical floor installation and mounting of one portion of the present invention, namely, the light source and light transmitting strips.
Figure 3:
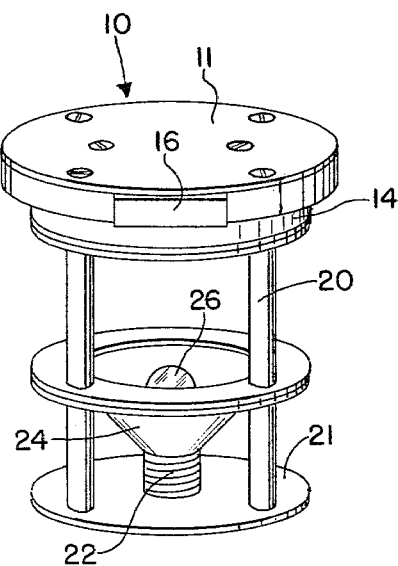
FIG. 3 is a perspective view of an embodiment of the light source, with the housing removed.
Figure 4:
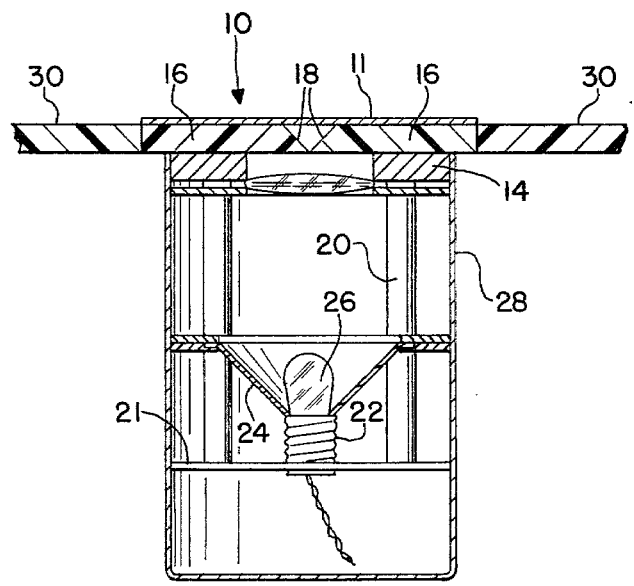
FIG. 4 is an elevational view, in partial section, taken along line 4—4 in FIG. 2.

The system is shown, by way of illustration of an embodiment, being utilized in an aircraft passenger compartment, as generally shown in the cut-away plan view of FIG. 1, a plurality of light sources (10) are positioned with their upper extremity (11) flush with the upper surface of the floor covering or carpeting (12), as seen more clearly in FIG. 2. The light source (10) includes a head portion (14) which is slotted to accept the substantially rectangular light transmitting member (16) which has its central portion provided with at least one 45° bevel (18), in the present instance two bevels (18) are shown although in end or terminal light sources a single bevel is sufficient. A framework (20) extends axially from the supporting head (14) and at its lower extremity carries a plate (21) which supports a socket (22) with surrounding reflective member (24). A light source (26), either an appropriate low voltage lamp or a high intensity bulb are selected for the particular application. The choice of lamp, or course, is determined by the available supply voltage in the system environment, lamp reliability criteria, and the required intensity level in the system environment. The details of this embodiment as best seen in FIG. 3 are shown with the housing (28) removed for purposes of clarity in description. The means for mounting relative to the floor and its covering (12) are a matter of choice, in the present embodiment the flanged head (14) is countersunk in the floor with the upper extremity being covered with an access plate (11) that is removable for servicing the unit. Fastener means, in the present instance screws are used, permit the plate (11) to be removed along with the light transmitting member (16) to provide access to the bulb or lamp for replacement purposes.

Extending outwardly from the free ends of member (16) are one or more light transmitting strips (30) which are substantially identical to member (16) in cross-section. Preferably, the ends of member (16) and its adjoining strip (30) are in abutting relation to secure maximum transmission of light that is translated 90° by the bevels (18) from the light source or bulb (24).

Referring again to FIG. 1, the stylized cabin shown is similar to the multiple cabin aircraft known as the DC-10, 747, or L-1011, wherein a pair of aisles run parallel to the axis of the fuselage and are defined at the ends of each passenger compartment by a transverse wall and passageway leading to particular exits. Spaced light sources are located in each aisle as well as in the transversely disposed passageways, the term aisle and passageway may be used interchangeably for purposes of description since they are also applicable to stationary structures where the function of this system is also applicable. Light strips (30) extend along the axis of such aisles and are preferably centrally disposed therein. Such strips (30) can be installed in existing aircraft simply by cutting the carpeting to the width of the strip (30) and gluing the strip to the floor. Each of the strips (30) have a length approximately one-half (½) the distance between adjacent light sources (10) and are preferably spaced a slight distance from the next adjacent strip (30). By doing this it is possible to better control the displayed pattern of sequentially pulsing the light sources to provide a travelling light path directing particular passengers seated adjacent a particular aisle to an appropriate available exit. This directional control of the passengers is necessary for rapid evacuation as well as preventing pile-ups at an exit that is unavailable for some reason that has been detected by one of the sensors.

While the preferred form has separated or spaced strips (30), it should be recognized that a continuous strip will operate albeit not as satisfactorily as the spaced strips since the latter more clearly delineate the moving or sequentially pulsed lights and the desired pattern of "travel". The length of the strips (30) is optional, although it has been found that if the strips extending from opposite sides of a light source (10) do not exceed a combined overall length of approximately three feet, or eighteen inches per strip, the light source can be from a low voltage bulb and still adequately illuminate the strips (10). The intensity of the light source is dependent upon the environment and the most commonly anticipated conditions that will exist in the case of an emergency. Shorter lengths of strips of the type discussed provide the best visibility in a smoke laden cabin and provide the ideal display for the pattern being displayed by the pulsing light sources since a greater number of strips would be sequenced within a given viewing area.

Of course, it is contemplated that the visual pulsing light sources could be supplemented with or replaced by audible or tactile discernable means for use by those who are visually handicapped.

Figure 5:
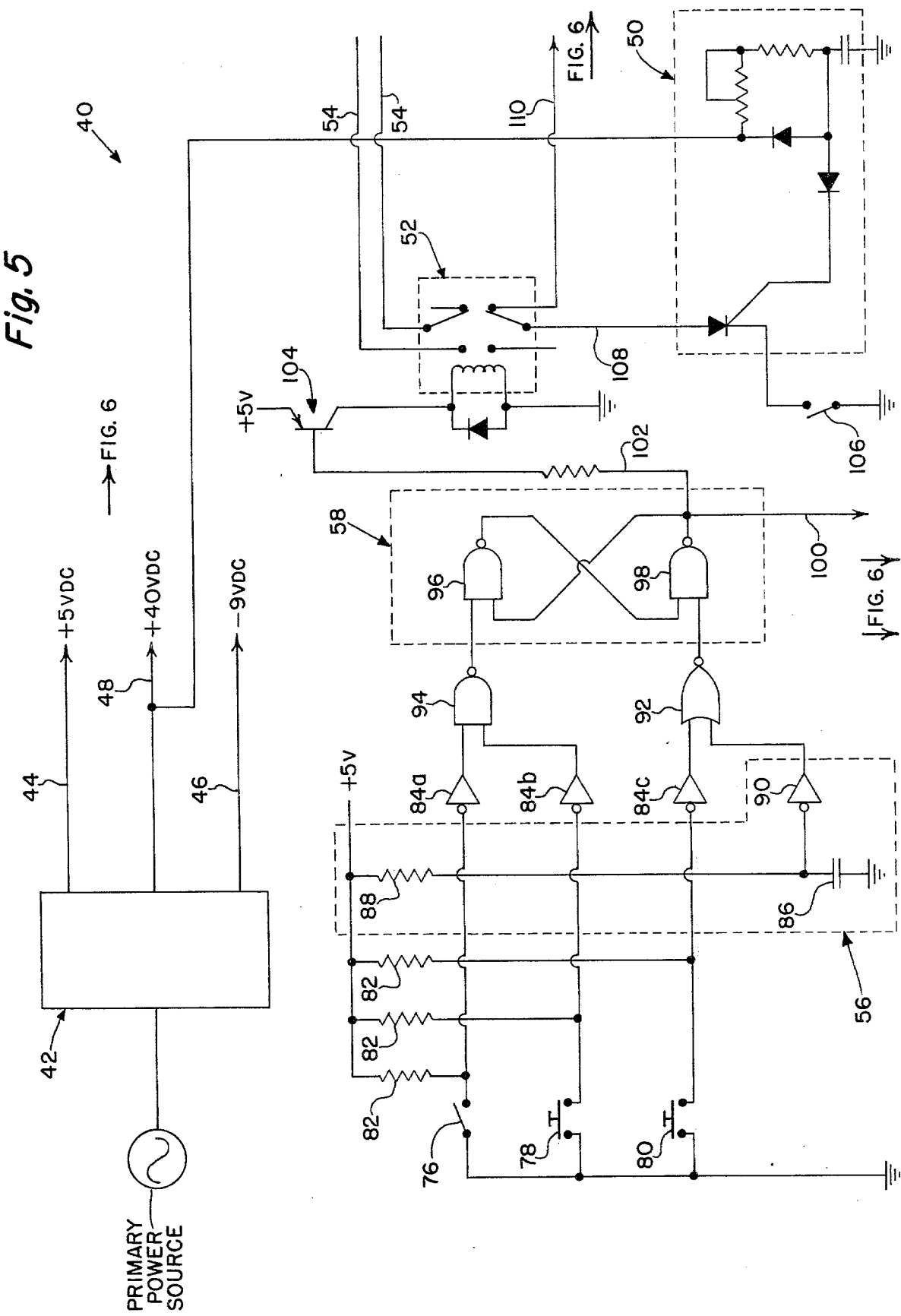
FIG. 5 is a partial circuit diagram of the control means for embodiment of the present invention.
Figure 6:
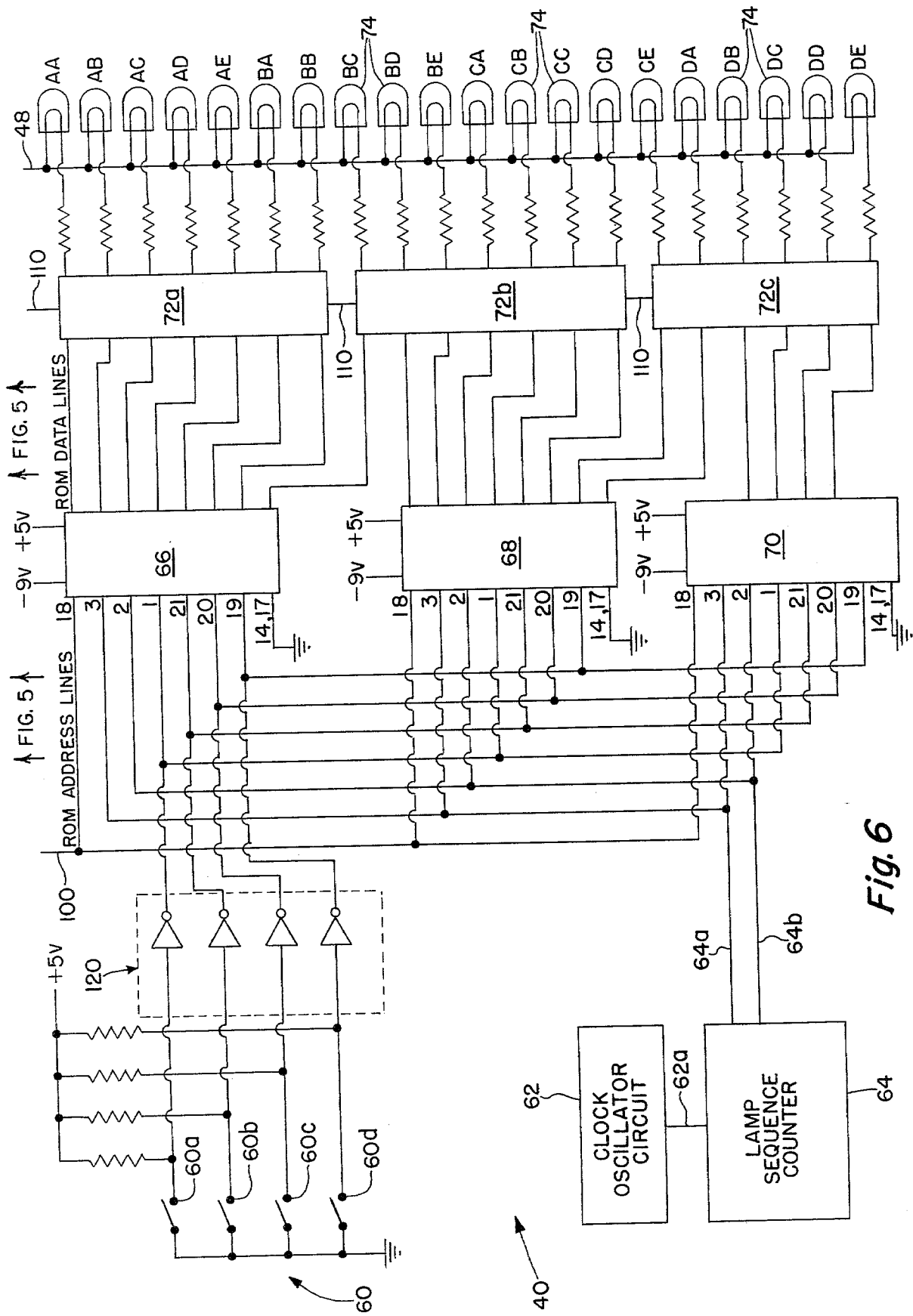
FIG. 6 is a circuit diagram showing the balance of the control means for this embodiment of the present invention shown in FIG. 5.

Referring now to FIGS. 5 and 6 wherein the control means (40), with its circuitry is disclosed, the control means (40) in this example is designated to control a single compartment of an aircraft and would be duplicated, amplified, or coupled to control the systems providing guidance in the other compartments of the aircraft.

Control means (40) includes a regulated power supply (42) that includes at least three leads that provide (1) a +5 volts DC source, designated by the numeral (44); (2) a −9 volts DC source, designated by the numeral (46); and (3) a lamp common line (48) that carries a half-wave rectified unfiltered DC source of approximately +40 volts. The control means further includes a dimmer circuit (50); an emergency relay (52) for cutting out the dimmer circuit (50) and activating the emergency audio circuit (54); a power-up reset circuit (56); an emergency set-reset latch (58); exit availability switches designated generally by the numeral (60); a clock oscillator circuit (62); a lamp sequence counter (64); lamp sequence read-only memories (66, 68 and 70); and the lamp drivers (72) with their associated lamps (74).

Referring now to FIG. 5, the power source (44) provides a positive 5 volt DC regulated power supply to run TTL (Transistor-transistor logic) integrated circuits. By way of example, a power source supplies AC voltage which is reduced by transformer and is rectified by a full wave bridge circuit, filtered by two parallel capacitors and then regulated down to a positive 5 volts DC by an integrated circuit, not shown. A center-tapped transformer secondary winding can be used to derive the half-wave rectified, unfiltered lamp common (48). The regulated negative 9 volt DC supply (46) can be derived from a standard series-pass transistor regulator, not shown. As will be appreciated, power supply outputs would be determined by the requirements of the system utilized. Those mentioned hereabove are merely selected to run the described circuit.

A plurality of switches of both a manual and automatic sensing nature are employed for activation and operation of the control means. In this embodiment there are provided an "arm" switch (76), an "emergency" switch (78) that is responsive to one or more sensing means, and an "emergency reset" switch (80). Each of these switches are connected to the inputs of type 7404 inverters, designated by the numerals (84a, 84b and 84c), respectively, which are used as buffers. Each input is pulled up to plus 5 volts DC through individual 2.2 K ohm resistors (82). When a switch is open, +5 volts (logic "1") is on the buffer (84) input, causing a "0" to appear on the buffer output. When a switch is closed, the buffer input is grounded (logic "0"), causing a "1" to appear on the output.

A power-up reset circuit (56) is included to insure that the emergency state is automatically reset when the system is first turned on by activation of the "arm" switch (76). Broadly, it may work as follows: after power is turned on by activation of the power supply (42), the 0.01 MF capacitor (86) is discharged, but will then charge toward +5 volts through the 100 K ohm resistor (88). When the capacitor (86) is fully charged the output of circuit (56), which is connected to the input of a 74C14 inverting buffer (90) causes the input of said buffer (90) which is initially at "0" level to go to "1" level as the capacitor charges. The output of buffer (90), on the other hand, inverts from a "1" level to approximately a "0" level. As can be seen the outputs of buffers (84c and 90) are connected to a type 7402 NOR Gate (92). A "1" level on either input of the 7402 NOR Gate (92) will reset an emergency condition. As indicated above, turning the system on will momentarily put a "1" on one input of gate (92). Pressing the emergency reset switch push button (80) will put a "1" on the other input. In either case, the emergency set-reset latch or circuit (58) will be reset to the "no" emergency state.

The "arm" and "emergency" switch buffers (84a and 84b) have their outputs connected to the inputs of a type 7400 NAND Gate (94). Gate (94) will set the emergency set-reset latch (58) only if the "emergency" switch (78) is momentarily (or permanently) closed and the "arm" switch (76) is closed.

The output from NOR Gate (92) and NAND Gate (94) are fed into the emergency set-reset latch (58) which includes a pair of type 7400 NAND Gate (96 and 98). Once such a circuit is set it will remain so until reset, and vice versa. In an emergency condition, the emergency output is a logic "0". When reset it is a logic "1". The output from latch (58) includes the emergency line (100) leading to the ROM's (66, 68 and 70) and line (102) connected to driver transistor (104) used to drive the relay (52). In an emergency condition the relay driver transistor (104) turns on and thereby activating relay (52).

Relay (52) contains at least two sets of contacts. Activation of relay driver transistor (104) causes one set of contacts to switch on power for the emergency audio recorded message system through leads (54). A second set of contacts disconnects the dimmer circuit (50) in an emergency for full lamp brightness. In a non-emergency state, the audio relay contacts are normally open and all lamps are controlled by the dimmer circuit (50) and the cabin illumination on/off switch (106) through leads (108–110).

The dimmer circuit (50) can be of any known type, but for purposes of illustration will be described hereinafter when the material covering the lamp driver (72) circuits has been discussed.

In the present embodiment the compartment of the aircraft is subdivided into four quadrants with five light sources being located in each quadrant, three light sources being located in each aisle, one adjacent an exit, and the last being located in the transverse passageway aligned with the opposite exits. The number of light sources is for purposes of discussion only and can be optimized to fit the physical size of the environment within which it is utilized. For purposes of control there are provided three ITT556 Lamp Driver Integrated Circuits (72a, 72b and 72c). Each of these I.C.'s includes seven separate inverting lamp drivers, with only six being used in driver (72c). To turn a given lamp, a logic "1" is applied to the appropriate lamp driver input. This causes the lamp driver output to switch to ground, turning the lamp on since the lamp common (48) is a positive, half-wave rectified voltage. Pin nine on each lamp driver is a lamp test pin, which, if switched to ground, will turn on all seven lamps controlled by each integrated circuit, regardless of the logic states on the driver inputs. In a non-emergency state, all lamp driver inputs are at a logic "0".

Referring back to the dimmer circuit (50), it operates by switching the lamp driver lamp test pins on and off at a 60 Hz. rate. The lamp brightness can be controlled by varying the percentage of the time that the lamp test pin is switched to ground. In a non-emergency state, the lamp test pins are connected by leads (108 and 110) through the contacts of the emergency relay (52) to the dimmer (50) which may include as part of its circuit a silicon-controlled rectifier. As was stated hereinbefore, the contacts of relay (52) will open in an emergency disconnecting the dimmer circuit. The SCR used in the dimmer is simply a solid-state switch used to switch the lamp test pins to ground at a duty cycle determined by the level adjust control, thereby, turning on all lamps, when the cabin illumination on/off switch (106) is closed.

As was previously stated, the effectiveness of the present invention requires that the discernable means be pulsed in particular patterns to assist the occupants to safely reach exits which are available for their evacuation. In the visual means embodiment being presently described, the emergency sequence patterns used to light the lamps in the light sources have been programmed into type 1702 programable/erasable Read-Only Memory Integrated Circuits (ROM's) of which there are three in the present control, namely, (66, 68 and 70). Each of these ROM's include data outputs and, in this particular type of ROM, there are seven address inputs. The ROM data outputs are connected directly to the lamp driver (72) inputs. If an emergency state exists a given lamp will be off if its ROM data output is at a logic "0", or ground level. The lamp will be on if its ROM data output is at a logic "1", or +5 volt level.

The lamp data output lines of each ROM are controlled by seven address inputs or lines. Each unique address input combination will turn on a different combination of lamps, depending on the availability of particular exits and the present state of the lamp sequences counter, which causes the lamps to cycle through the lamp pattern dictated by the available exits.

Four ROM address input lines are directly controlled by the state of the exit switches, with the information derived from these sensing switches being buffered by type 7404 Inverters, collectively indicated by the numeral (120). The respective address lines will be at a logic "0" if their respective exit switch is open (exit available), and, they will be at logic "1" if their respective exit switch is closed (exit unavailable), see ROM address lines (1, 21, 20 and 19).

One ROM address line (18) is connected to line (100) emanating from and controlled by the emergency set-reset latch (58). This line is at logic "1" in a non-emergency state. In this condition, all ROM data outputs are at logic "0", regardless of the state of the exit switches. Thus, all lamps should be off, unless the lamp driver lamp test pins are switched to ground through the lamp dimmer SCR. As long as this ROM address line is at logic "1", the lamps will not step through a sequence dependent upon exit switch state information. In an emergency state, however, this ROM address line (18) will go to a logic "0" (ground level) when the emergency set-reset latch is set. When this occurs the ROM data outputs will start to sequence through the lamp pattern determined by the available exits as sensed by the switches (60) and ancillary sensing equipment. (not shown).

Figure 7E:
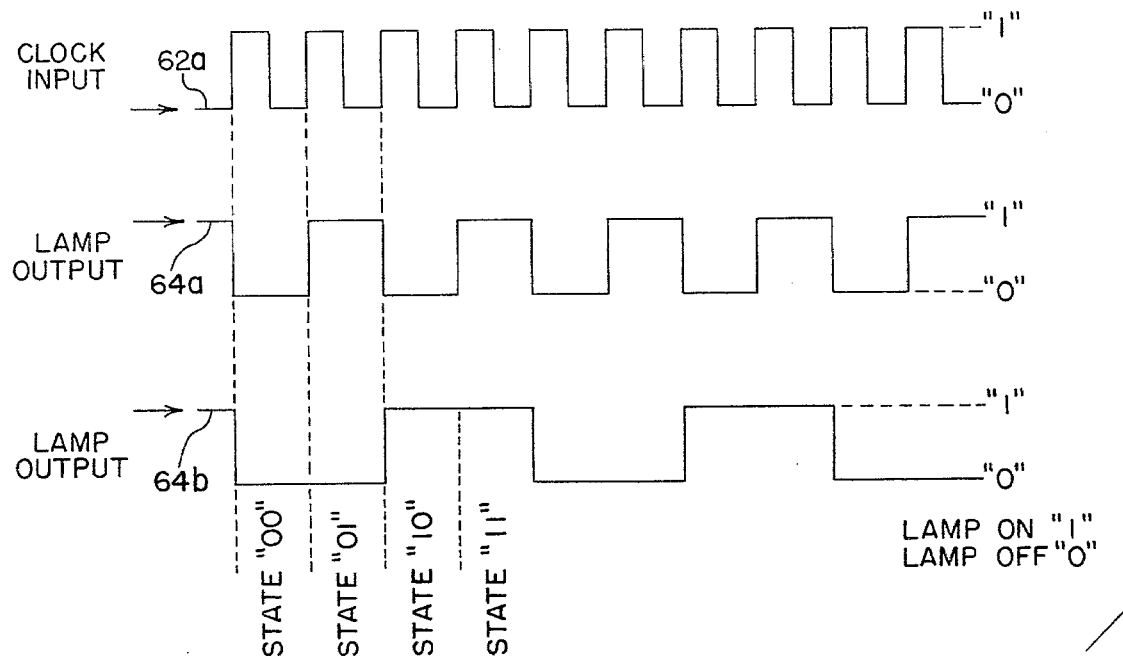
FIG. 7E is a line drawing of the wave pattern output of the two lines of the lamp sequence counter (which continually repeat a four state binary count sequence at a rate determined by the adjustable clock oscillator circuit.

The remaining two address lines are provided data from and controlled by a 2-bit binary lamp sequence counter (64) as regulated by an adjustable clock oscillator circuit (62). The lamp sequence counter (64) has two output lines which continually repeat a four state binary count sequence at a rate determined by the adjustable clock oscillator circuit (62). This is shown in FIG. 7E and displays the clock output plus the "C" and "D" outputs of the lamp sequence counter (64) which are fed as inputs (2 and 3) of the ROM. As shown, the two counter outputs continually repeat the four state pattern shown which causes the lamps to step through the lamp pattern determined by the information obtained from the exit switches based on the availability of a particular exit.

In FIG. 7F the output data lines provide a particular sequence in the operation of the various lamps whose position is indicated as black circles in FIG. 7A dependent upon a particular counter state as well as the availability of a particular exit. FIGS. 7A, 7B, 7C, and 7D assume that all exits are available. Rather than provide an excessive number of drawings to display all of the possible combinations, the programming of the ROM's for these possible combinations of exit unavailability or alternatively their availability are set forth in table form. Since the ROM truth tables are written in "Hex" notation for each form of address, dependent on the information available from the safe/unsafe exits, the first table provides the translation from groups of four bits (logic "1" or "0" binary digits) as written in "Hex" notation:

TABLE I

| BINARY | HEX |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | B |
| 1100 | C |
| 1101 | D |
| 1110 | E |
| 1111 | F |

Using the Hex notation set forth in Table I to express the date produced within the ROM's, Table II set forth below is based on information sensed as to the availibility of particular exits or combinations of exits and can be used to contstruct diagrams of the type shown in FIG. 7F to diagrammatically show the disposition or pattern of pulsed lights as schematically shown for no exits closed in FIGS. 7A through 7D.

TABLE II

| EXITS CLOSED | ROM ADDRESS | ROM #1 DATA | ROM #2 DATA | ROM #3 DATA |
|---|---|---|---|---|
| NONE | 000000 - 00 | 10 | 84 | 2 |
|  | 01 | 84 | 21 | 0 |
|  | 02 | 42 | 10 | 8 |
|  | 03 | 21 | 08 | 4 |
| A | 000100 - 04 | 40 | 84 | 2 |
|  | 05 | 24 | 21 | 0 |
|  | 06 | 0A | 10 | 8 |
|  | 07 | 81 | 48 | 4 |
| B | 001000 - 08 | 12 | 04 | 2 |

TABLE II-continued

| EXITS CLOSED | ROM ADDRESS | ROM #1 DATA | ROM #2 DATA | ROM #3 DATA |
|---|---|---|---|---|
|  | 09 | 81 | 21 | 0 |
|  | 0A | 40 | 50 | 8 |
|  | 0B | 2C | 08 | 4 |
| A, B | 001100 - 0C | 84 | 04 | 2 |
|  | 0D | 08 | 61 | 0 |
|  | 0E | 21 | 10 | 8 |
|  | 0F | 42 | 08 | 4 |
| C | 010000 - 10 | 10 | 90 | 2 |
|  | 11 | 84 | 09 | 0 |
|  | 12 | 42 | 02 | 8 |
|  | 13 | 21 | 20 | 5 |
| A, C | 010100 - 14 | 40 | 90 | 2 |
|  | 15 | 24 | 09 | 0 |
|  | 16 | 0A | 02 | 8 |
|  | 17 | 81 | 60 | 5 |
| B, C | 011000 - 18 | 12 | 10 | 2 |
|  | 19 | 81 | 09 | 0 |
|  | 1A | 40 | 42 | 8 |
|  | 1B | 2C | 20 | 5 |
| A, B, C | 011100 - 1C | 2C | 10 | 2 |
|  | 1D | 40 | 49 | 0 |
|  | 1E | 81 | 02 | 8 |
|  | 1F | 02 | 20 | 5 |
| D | 100000 - 20 | 10 | 84 | 8 |
|  | 21 | 84 | 20 | 4 |
|  | 22 | 42 | 10 | 1 |
|  | 23 | 21 | 0B | 0 |
| A, D | 100100 - 24 | 40 | 84 | 8 |
|  | 25 | 24 | 20 | 4 |
|  | 26 | 0A | 10 | 1 |
|  | 27 | 81 | 4B | 0 |
| B, D | 101000 - 28 | 12 | 04 | 8 |
|  | 29 | 81 | 20 | 4 |
|  | 2A | 40 | 50 | 1 |
|  | 2B | 2C | 0B | 0 |
| A, B, D | 101100 - 2C | 81 | 44 | 8 |
|  | 2D | 0A | 20 | 4 |
|  | 2E | 24 | 10 | 1 |
|  | 2F | 40 | 0B | 0 |
| C, D | 110000 - 30 | 10 | A1 | 0 |
|  | 31 | 84 | 02 | 1 |
|  | 32 | 42 | 08 | 4 |
|  | 33 | 21 | 10 | 8 |
| A, C, D | 110100 - 34 | 40 | 8B | 0 |
|  | 35 | 24 | 10 | 1 |
|  | 36 | 0A | 20 | 4 |
|  | 37 | 81 | 40 | 8 |
| B, C, D | 111000 - 38 | 12 | 20 | 5 |
|  | 39 | 81 | 02 | 8 |
|  | 3A | 40 | 49 | 0 |
|  | 3B | 2C | 10 | 0 |
| A, B, C, D | 111100 - 3C | 00 | 00 | 0 |
|  | 3D | 84 | 21 | 0 |
|  | 3E | 42 | 10 | 8 |
|  | 3F | 21 | 08 | 4 |

As can be seen from this program of the three ROM's covering this one illustrative compartment having exits A, B, C, and D, that when all exits are unavailable the pulsed pattern of lights sends the occupants to the next available compartment to determine whether any exits are available for safe use.

Figure 8:
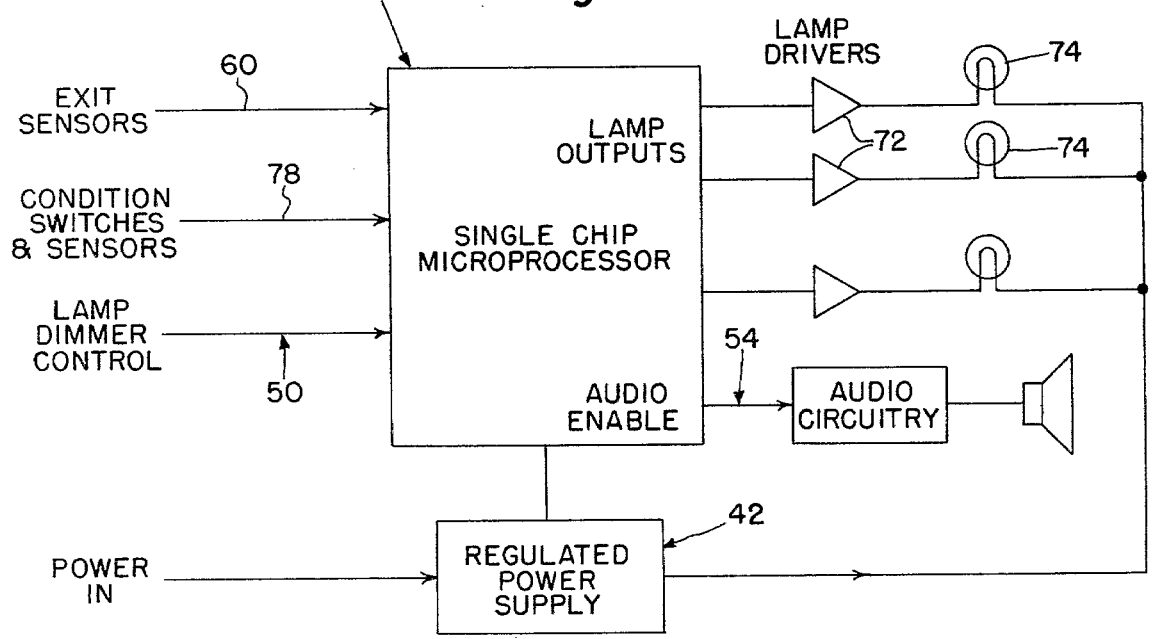
FIG. 8 is a schematic circuit diagram in abbreviated form showing the usage of a single chip microprocessor.

Referring now to FIG. 8 which shows a schematic diagram of a circuit utilizing a single chip microprocessor (120). Such a microprocessor would contain program storage and lamp pattern look up tables in ROM, plus RAM (read/write memory) for temporary data storage and manipulation and a central processing unit (CPU) which interprets input data in a manner defined by program storage ROM. Such a device would then output lamp data in the format defined by the program and appropriate for the current input conditions.

Further tasks that could be performed by such a microprocessor could include: (1) controllable low level illumination of a constant nature for lighting the aisle or passageway where it is used; (2) control the intensity of the light output by varying lamp duty cycle as a function of the dimmer control, if a continuous variable level of light output is desirable there are many possible means, not shown, for implementing the user level controls, some of these include potentiometers or brighter/dimmer pushbutton switches; (3) automatic override of the lamp intensity control during an emergency whereby all lamps would be placed at maximum intensity; (4) interpretation of manual override inputs and execution of appropriate outputs as well as sensing and implementing system demonstrator conditions, when required, as for example when the attendents display the capability of the system to passengers; (5) automatic audio system enable in the presence of an emergency; and (6) at the time of emergency, sensing of exit sensors and manual controls to automatically sequence the lamps in the proper pattern from the program storage ROM and at the predetermined proper rate of sequence.

While the circuit shown in FIG. 8 only shows three lamp drivers and lamps it will be appreciated this is for illustration purposes only. The total number would be dependent upon the configuration of the structure, the power available and the various number of sensors utilized for controlling the operation of the system. Such items can be individually designed to fit the parameters established by the ultimate user.

In those instances where an audible or tactile means are utilized for the indicia to be discerned by the passengers, a pulsating sequentially operated buzzer system can be sensed with reasonable accuracy, as can a vibratory generator which pulses closely spaced tactile means.

Thus, the present invention provides a plurality of spaced discernable means pulsed in a predetermined pattern controlled by information indicating the availability of particular exits from the structure. Means are provided to control the rate of such pulses as well as means to override information developing sensing means whereby on-the-spot evaluation of a condition can permit manual input which will override malfunctioning sensing means. Relay means that are activated in an emergency are provided to automatically override the use of the light sources for general illumination and bring them to maximum intensity during the sequential pulsing pattern phase of their operation; as well as simultaneously activating an emergency audio circuit for transmission of instructions to occupants on the use of the emergency activated discernable means.

While electronic means have been discussed in the two embodiments disclosed herein, the main reason for choosing devices of this type resides in the fact that they are lightweight, shock resistant and diminutive in size. As a result they are ideally adapted for use in the restricted confines of an aircraft. While not shown in the specification or drawing, the inventors hereof contemplated and utilized a system of relays which can accomplish this same function in an electro-mechanical fashion, however, because of the physical size and weight of such a system as well as its reaction to shock input, it is felt that the system described are preferred, although, a relay system is not discounted since it will function satisfactory under more static conditions such as in building structures.

Working embodiments of the present invention have been described in detail. It will be appreciated by those skilled in the art that alternate circuits, sensing means and physical arrangement of parts can be accomplished without departing from the spirit of the invention as defined by the following claims.

I claim:

1. An emergency guidance system for providing occupants of a structure with a logical escape route when such structure is subjected to a catastrophe, including means sensing the availability of particular safe exits from said structure, discernable means arranged in display along predetermined pathways within said structure leading to available exits not affected by said catastrophe, control means responsive to said sensing means for controlling said discernable means to provide detectable pathways leading the occupants to said available safe exits.

2. A system of the type set forth in claim 1 wherein said discernable means is visual in nature and includes a plurality of spaced light sources.

3. A system of the type set forth in claim 2 wherein said light sources are sequentially pulsed to define a pattern the sequence of which will lead said occupants to said available safe exits.

4. A system of the type set forth in claim 3 wherein said light sources are located at a low level of height with respect to said passageway to preclude interference from suspended particulate matter.

5. A system of the type set forth in claim 3 wherein said passageway includes a floor and the visual means being located along the axis of the passageway in the floor.

6. A system of the type set forth in claim 3 wherein the visual means includes a power source, spaced light sources embedded in a supporting surface and generally flush therewith, light transmitting strip means emanating from said light sources in particular directions and mounted relative to said supporting surface.

7. A system of the type set forth in claim 6 wherein the light transmitting strip means includes reflection means for translating the direction of the light path from the light sources to the strip means.

8. A system of the type set forth in claim 7 wherein the strip means and light sources have exposed surfaces that are substantially level with a covering on the said supporting surface to provide a smooth surface, each light source including a light emitting element, first reflection means for directing said light, first strip means having beveled ends positioned to receive said directed light and adapted to reflect said light and translate its direction by approximately 90°, thereby displaying said light along said axis of the available passageways.

9. A system of the type set forth in claim 8 wherein there is provided secondary strip means in light transmitting relation to said first strip means to carry and display said light along said axis of said passageways.

10. A system of the type set forth in claim 8 wherein said passageway includes a floor, each of said light sources is self-contained within said floor but accessible for maintenance from floor level by means of an access plate.

11. A system of the type set forth in claim 1 wherein said sensing means includes temperature responsive means.

12. A system of the type set forth in claim 1 wherein said sensing means includes particulate sensing means.

13. A system of the type set forth in claim 1 wherein said sensing means includes structural damage sensing means.

14. A system of the type set forth in claim 1 wherein said sensing means includes impact sensing means.

15. A system of the type set forth in claim 1 wherein there is provided manual control means for over-riding said sensing means.

16. A system of the type set forth in claim 3 wherein said control means includes means for adjusting the speed of sequentially activating said light sources.

17. A system of the type set forth in claim 2 wherein said control means includes means for illuminating all of said light sources simultaneously for general illumination of said passageway under normal conditions without an emergency condition being present.

18. A system of the type set forth in claim 17 wherein said control means includes means for controlling the intensity of said light sources whereby uniform constant dimmed light can be provided for minimal illumination in said passageways, as during night-time operations.

19. A system of the type set forth in claim 1 wherein said control means includes means for activating an audio circuit to produce an audible set of instructions to said occupants for proper utilization of said passageways.

20. A system of the type set forth in claim 3 wherein said control means includes means for manually adjusting the pattern of light displays when a particular sensing mechanism is inoperative.

21. A system of the type set forth in claim 1 wherein said structure is a passenger aircraft and said passageways include at least one aisle within the passenger compartment leading to the emergency exits therein.

22. A system of the type claimed in claim 1 wherein said discernable means is audible in nature.

23. A system of the type claimed in claim 1 wherein said discernable means is tactile in nature.

24. A system of the type set forth in claim 1 wherein said control means includes regulated power source means for both said control means and said discernable means, means for accepting the input from the sensing means which determine the availability of using a particular exit, said input accepting means establishing the sequence of activating particular discernable means dependent upon exit availability.

25. A system of the type set forth in claim 24 wherein said discernable means is visual in nature and includes a plurality of spaced light sources.

26. A system of the type set forth in claim 25 wherein said sequence means sequentially pulses said light sources in a predetermined pattern.

27. A system of the type set forth in claim 26 wherein said control means includes means for establishing the pulse rate for pulsing said light sources.

28. A system of the type set forth in claim 24 wherein said control means includes means for resetting and over-riding the input from said sensing means.

29. A system of the type set forth in claim 27 wherein said means for establishing the pulse rate is variable.

30. A system of the type set forth in claim 25 wherein said control means includes means for simultaneously lighting all of said light sources for general illumination purposes in non-emergency conditions.

31. A system of the type set forth in claim 30 wherein means are provided for dimming in intensity said light sources for night-time conditions of rest.

32. A system of the type set forth in claim 31 wherein means are provided for over-riding said means which dim the intensity of the light sources in the event of an emergency whereby said light sources are immediately brought to their highest intensity and returned to their pulsed mode to delineate the preferred passageway for movement to a particular exit.

33. A system of the type set forth in claim 26 wherein said means for establishing the sequence of pulsing particular light sources includes at least one programmable read-only memory having a plurality of outputs connected directly to lamp driver inputs to provide said light sources with information from said outputs controlled by address inputs responsive to said sensing means and dependent upon availability of safe exits which are sensed by said sensing means, whereby said light sources are caused to cycle through the light pattern dictated by the available exits.

* * * * *